United States Patent [19]

Graffin

[11] Patent Number: 5,287,896
[45] Date of Patent: Feb. 22, 1994

[54] METHOD AND APPARATUS FOR MEASURING OUT BY WEIGHT

[76] Inventor: André Graffin, La Tasse d'En Bas, 72405 La Chapelle Du Bois, France

[21] Appl. No.: 910,494

[22] Filed: Jul. 8, 1992

[30] Foreign Application Priority Data

Jul. 23, 1991 [FR] France .................. 91 09287

[51] Int. Cl.⁵ .............................. B65B 3/28
[52] U.S. Cl. ........................... 141/9; 141/1; 141/83; 141/104; 141/128
[58] Field of Search .............. 141/103, 104, 105, 83, 141/128, 1, 9

[56] References Cited

U.S. PATENT DOCUMENTS

| | | | |
|---|---|---|---|
| 3,985,266 | 10/1976 | Wright, Jr. | 141/83 X |
| 4,211,263 | 7/1980 | Kennedy et al. | 141/83 |
| 4,630,654 | 12/1986 | Kennedy, Jr. | 141/83 |
| 4,688,610 | 8/1987 | Campbell | 141/83 |
| 4,856,563 | 8/1989 | Yamaguchi et al. | 141/1 |
| 5,148,841 | 9/1992 | Graffin | 141/83 |

FOREIGN PATENT DOCUMENTS

| | | |
|---|---|---|
| 0052546 | 10/1981 | European Pat. Off. . |
| 0221367 | 10/1986 | European Pat. Off. . |
| 0406092 | 6/1990 | European Pat. Off. . |
| 0430897 | 10/1990 | European Pat. Off. . |

Primary Examiner—Ernest G. Cusick
Attorney, Agent, or Firm—Griffin Butler Whisenhunt & Kurtossy

[57] ABSTRACT

The method comprises the following steps: inserting a substance into a receptacle with at least one filling stage of fixed duration during which filling is performed at a servo-controlled flow rate using a servo-control loop including a weighing member, a weighing processor unit, and a flow rate control member; measuring the weight of substance contained in the receptacle after filling; comparing the weight of substance contained in the receptacle with a reference weight; and adjusting the servo-control relationship as a function of a difference between the weight of substance contained in the receptacle and the reference weight. An apparatus is provided to accomplish the above functions.

12 Claims, 2 Drawing Sheets

METHOD AND APPARATUS FOR MEASURING OUT BY WEIGHT

The present invention relates to a method and apparatus for measuring out by weight.

BACKGROUND OF THE INVENTION

Apparatuses for measuring out by weight are known that generally comprise carousel having a rotatably mounted platform supporting a series of weighing members above which filling nozzles are disposed that are connected to a feed member. The opening and closing of the filling nozzles is controlled by a weighting processor unit connected to the weighing members. Receptacles to be filled are brought one after another onto a weighing member and they are filled while the platform is rotating, prior to being removed therefrom.

Given the space occupied by the devices for installing empty receptacles and for removing receptacles that have been filled, filling cannot be performed over an entire turn of the platform, but only over a fraction of a turn. In general, filling takes place over an angular sector of about 270° which corresponds to a maximum filling time that is a function of the speed of rotation of the platform. This speed of rotation of the platform is itself given by the throughput desired from the installation as a whole. In present systems, it is common to require an installation to have a filling throughput that may be as high as several hundred receptacles per minute.

In present systems, the weight of substance inserted into a receptacle is controlled either by timing or by weighing. When control is by timing, a first estimate is made of the time required for inserting a determined weight of substance into a receptacle, then the weight actually inserted into receptacles is checked, and the length of time the filling nozzles are opened is adjusted as a function of the difference between the weight as actually measured and the reference weight desired in the receptacle. Thus, in order to be able to adjust the actual filling time it is necessary to provide an adjustment period of time at the end of filling corresponding to some angular sector and during which the filling nozzles may be opened or closed. This adjustment period of time is used to a greater or lesser extent depending on whether filling actually takes place more slowly or more quickly than initially expected. This adjustment period of time must be taken from the maximum available filling time such that the actual filling time is less than the maximum filling time.

When filling is directly controlled by weighing, the weighing member switches off the filling operation when the weight inserted in the receptacle reaches a determined threshold. The actual time taken for filling therefore varies, in particular as a function of the viscosity of the substance. Under such circumstances, it is thus also necessary to provide an adjustment period of time at the end of filling during which the filling nozzles are closed or are kept open depending on whether or not the reference weight threshold has been reached. As before, it is therefore not possible to make continuous use of the maximum filling time.

In either case, it is therefore necessary to provide the platform with a speed of rotation that allows normal filling to take place over an angular sector that is smaller than the maximum angular sector, e.g. over an angular sector of 240° rather than 270°. Given that the maximum flow rate through a filling nozzle is necessarily limited, the existence of an adjustment period of time necessarily puts a limit on the speed of rotation of the platform so as to ensure that enough time is available for normal filling while travelling through an angle of 240°. The throughput of the installation is thus correspondingly limited.

In addition, when the substance is semisolid, it is necessary to exert pressure thereon to cause it to leave the filling nozzle. The jet of substance transmits this pressure to a greater or lesser extent to the top of the substance already in the receptacle, depending on the viscosity of the substance, and thereby giving rise to an error in the data obtained by the weighing member. When filling is directly controlled by weighing, i.e. When the filling nozzle is closed on the weight reaching a determined threshold, such errors can be unacceptably large.

The object of the invention is to provide a method and an apparatus enabling filling throughput to be increased relative to existing devices, without loss of accuracy.

SUMMARY OF THE INVENTION

According to the present invention, this object is achieved by a method of weighing out comprising the following steps: inserting a substance into a receptacle with at least one filling stage of fixed duration during which filling is performed at a flow rate servo-controlled to a reference flow rate by a servo-control relationship between a flow rate error and a setting applied to a flow rate control member; measuring the weight of substance contained in the receptacle after filling; comparing the weight of substance contained in the receptacle with a reference weight; and adjusting the reference flow rate as a function of a difference between the weight of substance contained in the receptacle and the reference weight.

Thus, since the time taken for filling is constant, the entire filling zone is used on each occasion, so the speed of rotation of the platform can be increased so that the filling zone is travelled through in the specified fixed time. In addition, when filling is monitored as a function of flow rate rather than of weight, it is possible to eliminate those magnitudes that usually disturb weighing, in particular the pressure of the jet and the tail-back of the substance that has already left the filling nozzle, thereby making it possible to perform correction systematically and with great accuracy.

In an advantageous version of the invention, when the method includes at least two filling stages at different reference rates, at least one of the reference flow rates is adjusted as a function of the difference between the weight of substance contained in the receptacle and the reference weight. Thus, when the method includes filling stages at very different flow rates, a small difference in the weight of the substance contained in the receptacle relative to the reference weight can be corrected by acting on the smaller flow rate while a large difference is preferably compensated by acting on the greater flow rate.

The method of the invention is preferably implemented by means of weighing out apparatus comprising a feed member connected to at least one filler nozzle via a flow rate control member, a receptacle disposed beneath the filler nozzle and supported by a weighing member, and a weighing processor unit connected to the flow rate control member and to the weighing member to form a servo-control loop applying a setting to the flow rate control member so as to maintain a flow rate of substance through the filler nozzle at a reference flow rate, which flow is servo-controlled during a fixed length of time, comparing the weight of substance inserted into the receptacle with a reference weight, and adjusting a parameter of the servo-control loop as a function of a difference between the weight of substance inserted and the reference weight.

BRIEF DESCRIPTION OF THE DRAWINGS

An embodiment of the invention is described by way of example with reference to the accompanying drawings, in which.

DETAILED DESCRIPTION

Figure 1:
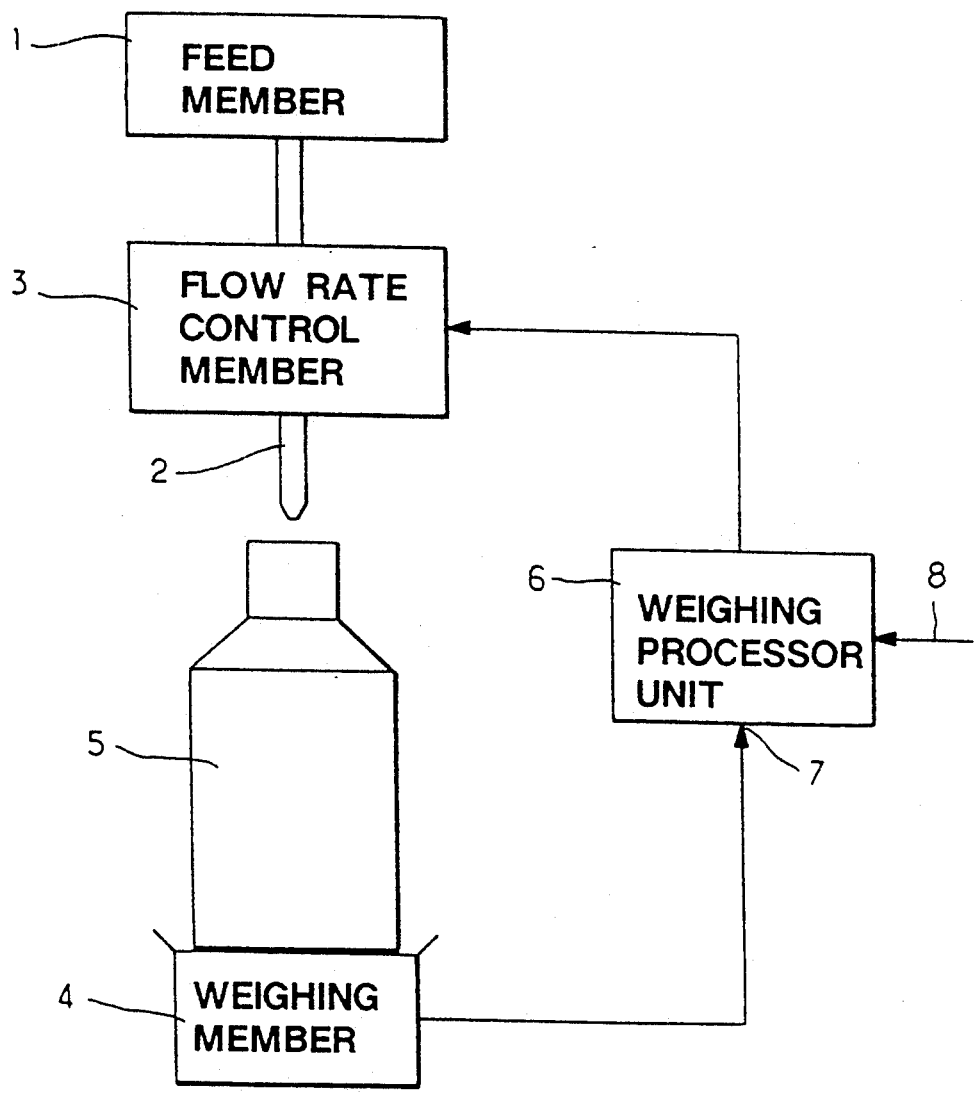
FIG. 1 is a block diagram of a weighing out apparatus of the invention.

With reference to FIG. 1, the apparatus of the invention includes a feed member 1. For example, the feed member may be a tank carried by the rotary platform of a carousel or it may be a tank separate from the carousel and connected thereto via a duct including a rotary joint. Flow from the feed member may be assisted by a centrifugal pump.

The feed member 1 is connected to a series of filler nozzles 2 (only one of which is shown in the FIGURE) via respective flow rate control members 3, each disposed upstream from a corresponding filler nozzle in the flow direction of the substance. The flow rate control members 3 may be variable-section valves or Archimedes' screws controlled by variable-speed stepper motors, with the speed of a motor determining the flow rate driven by an Archimedes' screw, in particular with a semisolid substance such as mayonnaise or a non-homogeneous substance such as a sauce with solid pieces in it.

A weighing member 4 is disposed vertically beneath each filler nozzle, and a receptacle is placed on each weighing member at the beginning of a filling cycle.

The weighing member is connected to an input 7 of a weighing processor unit 6 having another input 8 via which it receives initial data specific to the substance to be packaged. The initial data may, in particular, comprise the reference flow rate and the duration of each filling stage, together with the servo-control relationship that exists between a measured flow rate error and the reference flow rate that the weighing processor unit should be applying to the flow rate control member. It will be understood that this servo-control relationship varies depending on the fluidity of the substance. In particular, if the flow rate control member is a variable-section valve, the same flow section does not provide the same flow rate (e.g. 50 grams per second) for all substances be they liquid or semiliquid, and even with the same substance, flow rate may vary with variations in the pressure applied upstream from the flow rate control member, or with variations in the temperature of the substance (which affects its viscosity). The initial data thus contain either the servo-control relationship between the flow rate error and the setting to be applied to the flow rate control member in direct form, or else it contains parameters such as the nature of the substance, its temperature, and its feed pressure, and the weighing processor unit is then provided with calculation members enabling it to establish the servo-control relationship between the reference flow rate and the setting it actually needs to apply to the flow rate control member. As mentioned above, the setting applied depends on the type of flow rate control member used. For example, it may be given by the size of the flow section of a variable-section valve, or by the speed of rotation for a motor driving an Archimedes' screw. The outlet from the weighing processor unit 6 is connected to the flow rate control member to form a servo-control loop.

In addition, the weighing processor unit 6 is fitted in conventional manner with a clock and with a calculation unit enabling it to determine at all times the effective filling rate of a receptacle by comparing the increase in weight of the receptacle with the time that has elapsed since the last time its weight was measured. Given that modern weighing members have an extremely rapid reaction time, of the order of 1,000-th of a second, the pressure of the jet of substance has practically no time to change in the interval between two weight measurements, and as a result the measured difference in weight is indeed representative of the quantity of substance that has been inserted into the receptacle during the time interval under consideration, with an extremely accurate measure of the real flow rate thus being obtained.

As measured above, the initial data concerning the reference flow rate and the duration of each of the filling stages is applied to the weighing processor unit as a function of the substance to be packaged. For example, if it is desired to package 1 kilogram of a liquid that is liable to foam on striking the bottom of a receptacle suddenly, it is preferable to provide an initial filling stage at a low flow rate so as to insert a small amount of substance without causing it to foam, e.g. a first stage at a flow rate of 100 grams per second and lasting for half a second, followed by a filling stage proper at a higher flow rate, e.g. at 500 grams per second for 1.8 seconds, and finally an end-of-filling stage again at a low rate in order to enable the flow to be stopped accurately. For example, the final stage may be at a rate of 100 grams per second and may last for half a second.

Figure 2:
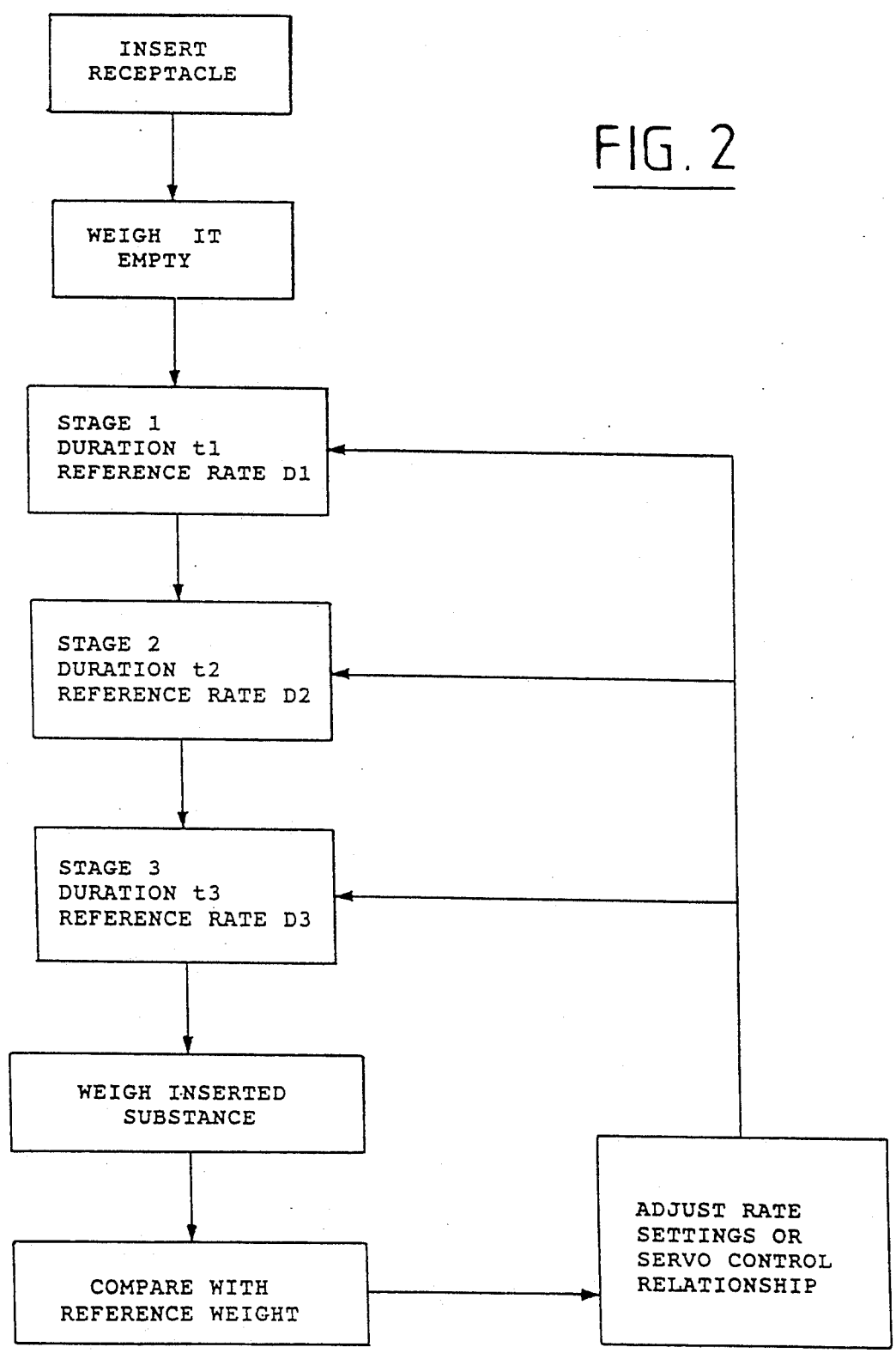
FIG. 2 is a flow chart illustrating the method of the invention.

The filling method then takes place as shown in FIG. 2, i.e. a receptacle is initially placed on the weighing member which transmits the empty weight of the receptacle as measured to the weighing processor unit. The first stage is then performed, e.g. by opening the flow rate control member 3 to deliver a flow rate D1 during a time ti. In the example mentioned above, $D1 = 100$ g/s and $t1 = 0.5$ s, with the initial setting applied to the flow rate control member being a function of the reference flow rate obtained by applying the servo-control relationship as initially input or calculated by the weighing processor unit, as mentioned above. The weighing member measures the apparent weight at regular intervals, e.g. once every hundredth of a second, i.e. it measures the force applied on the weighing member, which force is the result not only of the weight of the empty receptacle plus the substance it contains, but also of the pressure due to the jet of the substance. This information is applied to the weighing processor unit which takes the difference between the new value and the value obtained at the preceding instant and divides the difference by the time lapse. If the effective flow rate as determined in this way is different from the reference flow rate D1, a correction is instantly applied to the flow rate control member by giving it a new setting, as obtained by applying the above-mentioned servo-control relationship to the flow rate error. Once the time t1 has elapsed, the weighing processor unit applies a new setting to cause the flow rate control member to deliver the substance at a reference rate D2 for a time t2. As before, if the real rate is different from the reference rate, then the weighing processor unit changes the setting applied to the flow rate control member so that the real flow rate becomes equal to the reference rate. The same takes place during the third filling stage.

When filling is completed, the weighing member sends a total weight measurement signal to the weighing processor unit without interference from the pressure of the jet of substance. By taking the difference with the empty weight of the receptacle, the weighing processor unit calculates the net weight of substance inserted into the receptacle and compares this net weight with the reference weight, i.e. 1 kg in the present example. If the net weight differs from the reference weight, then at least one of the reference flow rates is adjusted so as to compensate this difference during the next filling operation. For example, in the example under consideration, if the weight turns out to be only 998 g, then the reference rate during the last stage is raised to 54 g/s, thereby automatically changing the initial setting applied to the flow rate control member at the beginning of said stage. If the effective net weight differs considerably from the reference weight, it may then be desirable to change the reference flow rate during the second filling stage rather than the reference flow rate during the third filling stage. Which reference flow rate to change can be decided on the basis of a difference threshold between the real net weight and the reference net weight so as to avoid changing the reference flow rate during the third filling stage too much: for example, if the difference between the real net weight and the reference net weight at the end of a first filling operation is 90 g too much, e.g. because the substance is much more fluid than expected, then there is no way in which the third filling stage could be adjusted to compensate for this excess, and it is preferable to reduce the reference flow rate during the second filling stage, bringing it down to 450 g/s, while keeping constant the servo-control relationship between the measured flow rate and the set rate applied to the control member so that servo-control at a rate of 450 g/s for a period of 1.8 s makes it possible to deliver 900 g of substance in fact.

It may be observed that because filling is performed over a constant length of time, it is possible to make use of all of the angular sector that is available for filling. Thus, in the above example where the total filling duration is 2.8 seconds, and assuming that the angular sector available for the complete filling operation is 270°, it is possible to drive the platform of the carousel at a speed enabling it to perform one revolution in 3.7 seconds, i.e. at 16.2 revolutions per minute (rpm). For a machine fitted with ten filler nozzles, the total throughput then obtained is 162 receptacles filled per minute. In contrast, in existing devices where it is necessary to leave an adjustment period of time at the end of filling, and assuming that the minimum filling time is 2.8 seconds as in the above case, then an angular sector of only 240° is available, and the time taken to travel along this sector must again be 2.8 seconds, which means that the platform takes 4.2 seconds to perform a complete turn. The platform can therefore rotate at 14.2 rpm only, and for an installation fitted with ten filler nozzles, the total throughput will be only 142 receptacles per minute. It can thus be seen that the invention makes it possible to increase the throughput of an installation significantly compared with existing installations.

Although the invention is described above on the basis that the reference flow rate is adjusted if the real net weight does not match the reference net weight, the method of the invention can also be implemented in any directly equivalent form, i.e. by acting on one of the parameters in the servo-control relationship between the measured flow rate and the setting given to the flow rate control member. In particular, it is possible to act on the gain of the servo-control loop formed by the weighing member 4, the weighing processor unit 6, and the flow rate control member 3. Under such circumstances, for the same reference flow rate, changing a parameter in the servo-control loop changes not only the initial setting given to the flow rate control member, but also the reactions of said member during servo-control such that while keeping the filling time constant it is possible to correct the real net weight inserted into a receptacle. The changes performed on the parameters of the servo-control loop may either on the gain of the loop or on the comparison performed between the real flow rate and the reference flow rate, e.g. by taking an average of the real flow rates (weighted to a greater or lesser extent) prior to making the comparison with the reference flow rate and applying a new setting to the flow rate control member.

Naturally the invention is not limited to the embodiment described and various embodiments can be provided without going beyond the ambit of the invention. In particular, although the invention has been shown diagrammatically as having a filler nozzle disposed above the neck of a receptacle, it is also possible to use a moving or "dipping" filler spout which is initially inserted into the receptacle and which is then raised progressively during filling. Such a procedure is possible with the invention, whereas using a dipping spout in weighing out machines where the flow of substance is switched off by a threshold weight being reached gives rise to considerable inaccuracy because of the buoyancy thrust due to the filler spout being immersed in the substance and which has a measurable effect on the weighing performed by the weighing member.

I claim:

1. A method for filling a receptacle with a predetermined weight of a substance in at least one filling stage, comprising, for each of said at least one filling stage:
   (1) inserting the substance into a receptacle for a fixed time period;
   (2) measuring the flow rate of the substance into the receptacle at time intervals during said fixed time period;
   (3) determining the difference between the measured flow rate and a predetermined reference flow rate; and
   (4) adjusting the flow rate of the substance into the receptacle as a function of said difference.

2. A method according to claim 1, wherein there are at least two filling stages at different reference flow rates, and at least one of the reference flow rates is adjusted as a function of said difference between the measured weight and the reference weight.

3. The method of claim 1 wherein the flow rate is adjusted by adjusting a flow rate control member.

4. The method of claim 1 wherein the weight of the substance in the receptacle is measured after the filling thereof, the difference between the measured weight and a reference weight is determined and the reference flow rate is adjusted as a function of the difference.

5. An apparatus for filling a receptacle with a predetermined weight of a substance in at least one filling stage, comprising:
   (1) insertion means for inserting the substance into a receptacle for a fixed time period during each of said at least one filling stage;
   (2) measuring means for measuring the flow rate of the substance filled into the receptacle at time intervals during said fixed time period;
   (3) processor means for determining the difference between the measured flow rate and a predetermined reference flow rate; and
   (4) servo-control means for adjusting the flow rate of the substance into the receptacle as a function of said difference.

6. The apparatus of claim 5 wherein the insertion means comprises at least one feed member connected to a filler nozzle via a flow rate control member.

7. The apparatus of claim 6 wherein the receptacle is supported by the weighting means.

8. The apparatus of claim 7 wherein the processor means is operable connected to the flow rate control member and to the weighing means so as to form a servo-control loop such that a setting may be applied to the flow rate control member, wherein the flow rate of the substance through the filler nozzle is maintained at the reference flow rate.

9. The apparatus of claim 8 wherein a parameter of the servo-control loop is adjusted to adjust the flow rate.

10. A method for filling a receptacle with a predetermined weight of a substance in at least one filling stage, comprising, for each of said at least one filling stage:
    (1) inserting the substance into a receptacle for a fixed time period;
    (2) measuring the flow rate of the substance into the receptacle at time intervals during said fixed time period;
    (3) determining the difference between the measured flow rate and a predetermined reference flow rate for each of said at least one filling stage;
    (4) adjusting the flow rate control member during each of said at least one filling stage as a function of said flow rate difference according to a predetermined flow control relationship;
    (5) measuring after filling the weight of the substance in the receptacle;
    (6) determining the weight difference between the measured weight and said predetermined weight; and
    (7) adjusting said reference flow rate for at least one filling stage as a function of said weight difference.

11. A method for filling a receptacle with a predetermined weight of substance in at least one filling stage comprising:
    (1) inserting the substance from a feed member via a flow rate control member into a receptacle for a fixed time during each of said at least one filling stage;
    (2) measuring the flow rate of the substance into the receptacle at time intervals during said fixed time period;
    (3) determining the difference between the measured flow rate and a predetermined reference flow rate for each of said at least one filling stage;
    (4) adjusting the flow rate control member during each of said at least one filling stage as a function of said flow rate difference according to a predetermined flow control relationship;
    (5) measuring after filling the weight of the substance in the receptacle;
    (6) determining the weight difference between the measured weight and said predetermined weight; and
    (7) adjusting said flow control relationship as a function of said weight difference.

12. A method according to claim 11 wherein there are at least two filling stages during which the flow rate control member is adjusted according to different flow control relationships, and at least one of said flow control relationship is adjusted as a function of said weight difference.

* * * * *